United States Patent
Tang

(10) Patent No.: US 10,520,950 B2
(45) Date of Patent: Dec. 31, 2019

(54) SELF-MOVING ROBOT MOVEMENT BOUNDARY DELIMITING METHOD

(71) Applicant: Ecovacs Robotics Co., Ltd., Suzhou (CN)

(72) Inventor: Jinju Tang, Suzhou (CN)

(73) Assignee: ECOVACS ROBOTICS CO., LTD., Suzhou (CN)

( * ) Notice: Subject to any disclaimer, the term of this patent is extended or adjusted under 35 U.S.C. 154(b) by 162 days.

(21) Appl. No.: 15/514,207

(22) PCT Filed: Sep. 25, 2015

(86) PCT No.: PCT/CN2015/090736
§ 371 (c)(1),
(2) Date: Mar. 24, 2017

(87) PCT Pub. No.: WO2016/045617
PCT Pub. Date: Mar. 31, 2016

(65) Prior Publication Data
US 2017/0248956 A1    Aug. 31, 2017

(30) Foreign Application Priority Data

Sep. 26, 2014  (CN) .......................... 2014 1 0504400

(51) Int. Cl.
*G05B 19/18* (2006.01)
*G05B 19/04* (2006.01)
(Continued)

(52) U.S. Cl.
CPC ............ *G05D 1/028* (2013.01); *B25J 9/1664* (2013.01); *G05D 1/0221* (2013.01)

(58) Field of Classification Search
CPC ...... G05D 1/028; G05D 1/0221; B25J 9/1664
See application file for complete search history.

(56) References Cited

U.S. PATENT DOCUMENTS 5,365,516 A * 11/1994 Jandrell ............... G01S 5/0009
340/991
5,951,610 A * 9/1999 Nagai .................. G05D 1/0261
701/23
(Continued)

FOREIGN PATENT DOCUMENTS

CN    202795052 U    3/2013
CN    103076802 A    5/2013
(Continued)

OTHER PUBLICATIONS

Extended European Search Report in corresponding European Patent Application No. 15844459.6, dated May 24, 2018 (8 pages).

*Primary Examiner* — Khoi H Tran
*Assistant Examiner* — Jorge O Peche
(74) *Attorney, Agent, or Firm* — Maschoff Brennan

(57) ABSTRACT

In a self-moving robot movement boundary delimiting method, in step 100: setting up three or more base stations in a movement area of a self-moving robot, and establishing a coordinate system; in step 200: artificially planning a movement path in the movement area of the self-moving robot, gathering sample points on the path, and determining the coordinates of the sample points in the coordinate system; and in step 300: delimiting a boundary according to the coordinates of the gathered sample points, and setting the self-moving robot to work inside or outside the boundary. The present invention achieves a regional division by distance measurement and positioning based on stationary base stations, thus improving accuracy and convenience compared to the prior art.

11 Claims, 4 Drawing Sheets

(51) Int. Cl.
    *G05D 1/02*     (2006.01)
    *B25J 9/16*     (2006.01)

(56) References Cited

U.S. PATENT DOCUMENTS

| | | | | |
|---|---|---|---|---|
| 5,974,348 | A * | 10/1999 | Rocks | G01S 1/70 |
| | | | | 348/120 |
| 7,026,992 | B1 * | 4/2006 | Hunt | G01S 5/0215 |
| | | | | 342/357.61 |
| 2002/0156556 | A1 * | 10/2002 | Ruffner | A01D 34/008 |
| | | | | 701/23 |
| 2003/0009277 | A1 * | 1/2003 | Fan | G01C 21/3492 |
| | | | | 701/117 |
| 2003/0191602 | A1 * | 10/2003 | Lee | G01S 13/825 |
| | | | | 702/150 |
| 2004/0158355 | A1 * | 8/2004 | Holmqvist | G05D 1/0236 |
| | | | | 700/245 |
| 2005/0027399 | A1 * | 2/2005 | Koh | G05D 1/0221 |
| | | | | 700/258 |
| 2006/0020370 | A1 | 1/2006 | Abramson | |
| 2007/0042716 | A1 * | 2/2007 | Goodall | G05D 1/0274 |
| | | | | 455/67.11 |
| 2008/0086236 | A1 * | 4/2008 | Saito | G01S 5/0252 |
| | | | | 700/245 |
| 2012/0150350 | A1 | 6/2012 | Ohno | |
| 2013/0041526 | A1 * | 2/2013 | Ouyang | G05D 1/0265 |
| | | | | 701/2 |
| 2013/0192183 | A1 * | 8/2013 | Choi | A01D 34/008 |
| | | | | 56/10.2 A |
| 2016/0165795 | A1 * | 6/2016 | Balutis | G05D 1/0265 |
| | | | | 701/25 |
| 2016/0174459 | A1 * | 6/2016 | Balutis | B25J 9/0081 |
| | | | | 701/25 |
| 2016/0206170 | A1 * | 7/2016 | Yi | A47L 9/2826 |
| 2017/0150676 | A1 * | 6/2017 | Yamauchi | G05D 1/0236 |
| 2017/0312916 | A1 * | 11/2017 | Williams | G01C 21/20 |
| 2018/0081366 | A1 * | 3/2018 | Tan | G05D 1/0265 |
| 2018/0356832 | A1 * | 12/2018 | Reinert | A01D 34/008 |
| 2018/0361577 | A1 * | 12/2018 | Williams | B25J 9/163 |
| 2018/0361581 | A1 * | 12/2018 | Williams | B25J 9/1664 |
| 2019/0049984 | A1 * | 2/2019 | Wong | G05D 1/0225 |
| 2019/0163175 | A1 * | 5/2019 | Ko | G05D 1/0088 |
| 2019/0208979 | A1 * | 7/2019 | Bassa | A47L 11/4038 |

FOREIGN PATENT DOCUMENTS

| | | | | |
|---|---|---|---|---|
| CN | 103823464 A | | 5/2014 | |
| GB | 2254508 A | * | 10/1992 | |
| GB | 2 386 971 A | | 10/2003 | |
| GB | 2386971 A | * | 10/2003 | ........... A01B 79/005 |
| KR | 10-2006-0106915 A | | 10/2006 | |

* cited by examiner

SELF-MOVING ROBOT MOVEMENT BOUNDARY DELIMITING METHOD

CROSS-REFERENCE TO RELATED APPLICATIONS

This application is a U.S. national stage of PCT/CN2015/090736, filed on Sep. 25, 2015, which claims priority to Chinese Patent Application No. 201410504400.6 filed on Sep. 26, 2014, the contents of which are each incorporated herein by reference in their entireties.

FIELD OF THE INVENTION

The present invention relates to a self-moving robot movement boundary delimiting method, which belongs to a technical field of self-moving robot movement control.

BACKGROUND ART

The self-moving robot is a typical robot, including various types such as sweeping robot, mowing robot, home service robot, surveillance robot and the like, and is very popular with customers for that it is characterized as being capable of walking freely. How to effectively control the movement of the self-moving robot within a certain working space is a key issue. In order to solve the problem of how to restrict the movement range of the self-moving robot, the self-moving robot needs to divide its movement region into blocks. The existing regional division methods comprise Satellite Positioning method, Marker Setting-up method, Spatial Infrared Signal Guidance method and the like. However, these existing regional division methods have the problems of low precision and cumbersome marker arrangement, and lack universality because their applications need to be particularly set according to the specific requirements of the actual environment. The invention application published as CN 101109809A discloses positioning device, system and method based on a direction control photosensitive array, in which the real-time positioning of moving objects in a house or a small area is realized using sine theorem calculation by three infrared signal emitters fixed in the same plane and a signal receiver mounted on the robot device. However, such method only can realize the real-time positioning of the robot, and has a low accuracy of calculation and cannot realize the function of delimiting movement boundary.

SUMMARY OF INVENTION

In view of the deficiencies in the prior art, the object of the present invention aims to provide a self-moving robot movement boundary delimiting method, which achieves regional division by distance measurement and positioning based on stationary base stations and has obvious advantages in term of either accuracy or convenience compared to the prior art.

The object of the present invention is achieved by the following technical solutions.

A self-moving robot movement boundary delimiting method comprises the following steps:

step 100: setting up three or more base stations in a movement area of a self-moving robot, and establishing a coordinate system;

step 200: artificially planning a movement path in the movement area of the self-moving robot, gathering sample points on the path, and determining the coordinates of the sample points in the coordinate system; and step 300: delimiting a boundary according to the coordinates of the gathered sample points, and setting the self-moving robot to work inside or outside the boundary.

In the step 100, establishing the coordinate system by using one of the base stations as an origin, and calculating distances between the respective base stations by measuring signal transmission time between the respective base stations, whereby determining the coordinates of the respective base stations in the coordinate system.

In the step 200, determining the coordinates of the sample points specifically comprises calculating the coordinates of the sample points in the coordinate system by measuring signal transmission time between the self-moving robot and the respective base stations, and methods for the calculation include Geometric Positioning method, Least Squares method or Time Difference Of Arrival method. In the step 200, the artificially planned movement path may be implemented in various ways, specifically including: a path formed by controlling the self-moving robot to move by a user via an interactive device; or a path formed by moving a positioning device provided for the self-moving robot in the movement area after the positioning device is detached from the self-moving robot by the user.

More specifically, the gathering of the sample points in the step 200 is an interval gathering which is performed automatically at a preset time interval by the self-moving robot being moved, or is a random gathering which is performed artificially.

The present invention establishes the coordinate system by setting up the base stations. The coordinate system may be a plane coordinate system or a three-dimensional coordinate system. In the different coordinate systems, the shapes of the delimited boundaries may differ.

Specifically, the coordinate system in the step 100 is a plane coordinate system established using three base stations, and a plane in which the plane coordinate system is located is coplanar with the movement area of the self-moving robot.

The boundary in the step 300 is an open or closed line formed by the sample points.

The coordinate system in the step 100 is a three-dimensional coordinate system established using four base stations.

The step 300 specifically comprises vertically or non-vertically projecting a set of the gathered sample points onto a plane, in which the movement area of the self-moving robot is located, to form mapped points, and the boundary is an open or closed line formed by connecting the mapped points.

The boundary in the step 300 is a plane determined using three sample points, or a plane fitted out using three or more sample points.

The boundary in the step 300 is a surface of a three-dimensional space constructed using a plurality of sample points by interpolating or fitting the sample points into a standard three-dimensional shape or a combination of standard three-dimensional shapes.

The standard three-dimensional shape is cube, cuboid, sphere or triangular pyramid.

In sum, the present invention delimits a movement boundary by distance measurement and positioning based on stationary base stations, and has obvious advantages in term of either accuracy or convenience compared to the prior art.

The technical solutions of the present invention will be described in detail with reference to the accompanying drawings and the specific embodiments.

DESCRIPTION OF ATTACHED DRAWINGS

DETAILED DESCRIPTION OF PREFERRED EMBODIMENTS

The present invention provides a self-moving robot movement boundary delimiting method which delimits a movement boundary by the distance measurement and positioning based on stationary base stations. To be specific, such automatic robot positioning system comprises a self-moving robot (MR) and three or more base stations (BS). The self-moving robot and the base stations each are provided with respective wireless signal transceivers. In order to ensure reliability of measurement, the wireless signal to be transmitted may be infrared ray, ultrasonic, laser, electromagnetic wave, etc., and the transmission speed k thereof is known. In a normal operation, the self-moving robot and the base stations transmit the wireless signals, receive the signals from each other and measure the transmission time t of the signals. The distances L between the base stations and the distances S between the self-moving robot and the respective base stations can be calculated by k×t.

Figure 1:
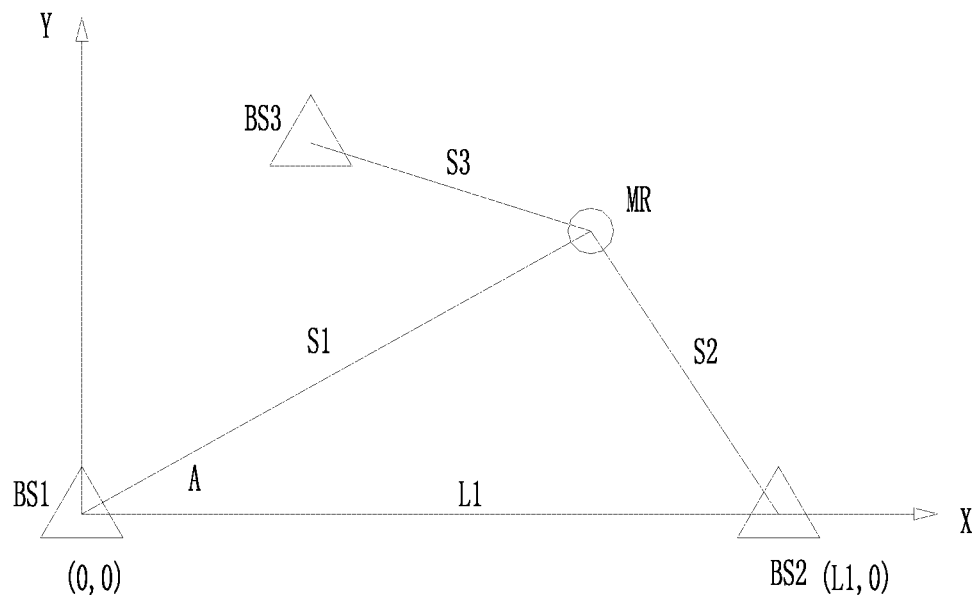
FIG. 1 is a schematic diagram of a plane coordinate system established according to the present invention.

FIG. 1 is a schematic diagram of a plane coordinate system established according to the present invention. As shown in FIG. 1, the plane coordinate system is established as follows. First, according to the principle of determining a plane using three points, a plane is determined using three base stations BS1, BS2 and BS3, and a coordinate system is established in the plane. The first base station BS1 is an origin (0, 0) of the coordinate system, and a straight line on which the first base station BS1 the second base station BS2 are located may be set as an X-axis while a straight line vertical to the X-axis is a Y-axis. With the above formula k×t, the relative distances L between the respective base stations are calculated, hereby obtaining the respective coordinates of the base stations in the plane coordinate system.

The above method of establishing the coordinate system is relatively simple. In practice, it is not necessary to set one of the base stations as the origin and to determine the X-axis using the first and second base stations. For example, under the assumption that the coordinates of the first base station are $(X_1, Y_1)$, the coordinates of the second base station shall be $(X_1+L_1 \times \cos A, Y_1+L_1 \times \sin A)$, where L1 is the distance between the first and second base stations, and A is the angle between the connection line of the first and second base stations and the X-axis. X1, Y1 and A may be arbitrarily selected to determine the coordinate system. Once the coordinate system is established, the coordinates of the respective base stations can be determined.

Of course, a plane coordinate system can be established using three base stations and a three-dimensional coordinate system can be established using four base stations. Further, it is to be noted that if the plane coordinate system is established using three base stations, it is necessary that the three base stations are not on the same line. In addition, the number of the base stations to be set up may be increased so as to improve the accuracy of calculation.

As shown in conjunction with FIG. 1, the distances S between the self-moving robot and the respective base stations are obtained by calculation. For example, in the case of the plane coordinate system established using three points, S1 is calculated according to the measured time t1 of the signal from the self-moving robot to the first base station as well as the known transmission speed. S2 and S3 can be calculated in the similar manner. As shown in FIG. 1, since the coordinates of the first base station BS1 are (0, 0), and the distance between the first base station BS1 and the second base station BS2 is L1, the coordinates of the second base station BS2 are (L1, 0). The angle A can be calculated according to S1, S2 and L1, and in turn the coordinates of the MR can be calculated according to S3. The calculation method utilized above may be referred to as the Geometric Positioning method.

Further, the coordinates of the MR can also be calculated by the Least Squares method according to the following formula:

$$(x-x_1)^2+(y-y_1)^2=r_1^2, \; r_1=t_1 \times k,$$

wherein the coordinates of the first base station BS1 are (x1, y1), the coordinates of the self-moving robot are (x, y), t1 is the transmission time of the signal from the self-moving robot to the first base station, and r1 is the distance from the self-moving robot to the first base station. Similarly, the formulas corresponding to the other two base stations can be obtained. The values of x and y (that is, the coordinates of MR) can be found once t1, t2 and t3 are measured.

In addition, a Time Difference Of Arrival (i.e., "TDOA" for short) method may be used to determine the coordinates of the MR.

The first base station is assumed to be farther from the MR than the second base station, and the formula is written out as below:

$$\sqrt{((x-x_1)^2+(y-y_1)^2)} - \sqrt{((x-x_2)^2+(y-y_2)^2)} = (t_1-t_2) \times k$$

wherein, the coordinates of the first base station are (x1, y1), the coordinates of the second base station are (x2, y2), the coordinates of the self-moving robot are (x, y), and t1 and t2 are the transmission time of the signal from the self-moving robot to the first base station and the second base station, respectively.

Similarly, the rest two formulas can be written out. Once t1, t2 and t3 are measured, the values of x and y (that is, the coordinates of MR) can be found.

The three methods described above can locate the movement of the robot. In order to obtain a boundary desired by the user, it is required to artificially manipulate the MR to move and gather sample points P on the movement path in advance. Specifically, the user may walk while holding the MR or a positioning device which has been detached from the MR and which is equipped with a signal transceiver, or may control the MR to move via an interactive device. The sample points should be gathered at intervals during the movement. The user may set the time interval for gathering the sample points by the interactive device so that the MR can automatically gather the sample points at this time interval, or may manually manipulate corresponding function keys to gather the sample points.

After the sample points P are obtained, the sample points may be connected according to the boundary delimiting modes preset on the interactive device. The boundary delimiting mode refers to the connection mode of the sample points. For example, the sample points may be connected sequentially by straight lines or curves to form a boundary, or the sample points are used to be fitted into a curved boundary, or the first and last points are connected to form a closed boundary, or the sample points are used to obtain a straight boundary of which both ends can be extended infinitely. The boundary delimiting mode may be artificially designed and programmed into the MR for easy selection by the user. The interactive device comprises a selector button or a selector indicator screen that is provided on the surface of the MR, or a remote control provided for the MR, or a mobile terminal (e.g., a mobile phone, a tablet, etc.) that communicates with the MR via Bluetooth or Wi-Fi.

After the boundary is delimited using the sample points, the MR is programmed and set to be prohibited from crossing the boundary, so that it can operate inside or outside the delimited boundary.

First Embodiment

Figure 2:
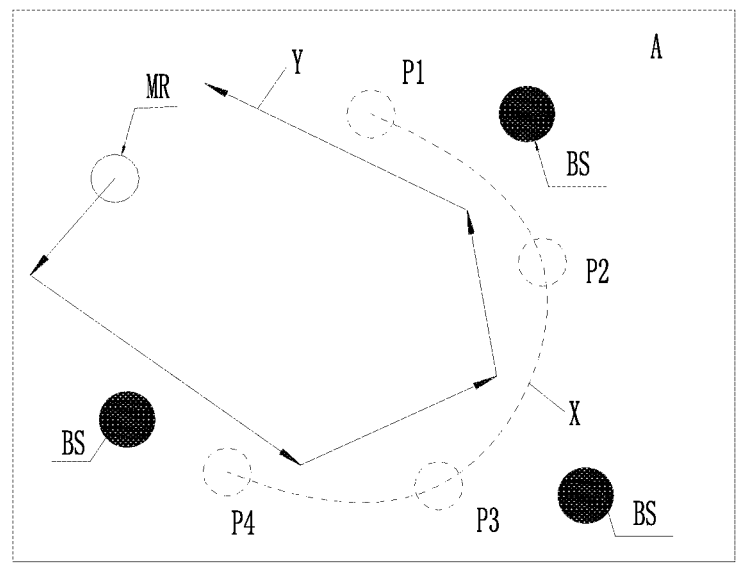
FIG. 2 is a schematic diagram of a first embodiment of the present invention.

FIG. 2 is a schematic diagram of the first embodiment of the present invention. As shown in FIG. 2, in the present embodiment, the self-moving robot movement boundary delimiting method mainly comprises the following steps:

first, determination of plane coordinate system: placing three base stations BS in the movement area A of the self-moving robot MR, such that the three base stations BS are assuredly not on the same line; and determining a plane coordinate system using the three base stations BS, wherein the plane coordinate system is located in the movement area A of the self-moving robot.

second, obtainment of sample points: obtaining sample points P by MR automatic gathering or by artificial random gathering; and calculating coordinates of the respective sample points by Geometric Positioning method, Least Squares method or Time Difference Of Arrival (i.e., "TDOA" for short) method.

last, completion of boundary delimiting: delimiting a straight or curved boundary according to the gathered sample points; and then achieving a regional division by setting the MR to be prohibited from crossing the boundary. In the embodiment shown in FIG. 2, the curve X is determined by the four gathered sample points P1 to P4. After the MR is set to be prohibited from crossing the curve X, as shown by a plurality of straight lines Y with arrows in FIG. 1 which shows the actual movement position of the MR, the MR only moves at one side of the curve X, and does not cross the curve X to move at the other side.

Of course, if there are additional obstacles such as walls in the movement area A, the additional obstacles may be combined with the curve X to achieve a completely separated regional division. Since both ends of the curve X are not closed at the boundary with the movement area A, it is preferable to connect the curve X and the obstacles or to add other design functions so that the regional division is more complete. In the case of a straight line determined using a number of sample points, the system may assume that the straight line can be infinitely extended from its endpoints until it intersects with the boundary with the movement area A to form a closed divided region.

Second Embodiment

Figure 3:
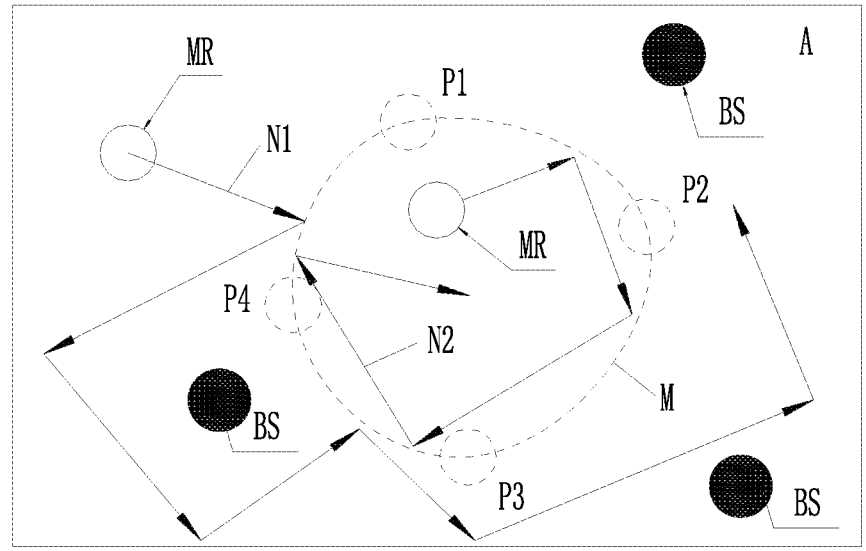
FIG. 3 is a schematic diagram of a second embodiment of the present invention.

FIG. 3 is a schematic diagram of the second embodiment of the present invention. As shown in FIG. 3, in the present embodiment, the self-moving robot movement boundary delimiting method mainly comprises the following steps:

first, determination of plane coordinate system: placing three base stations BS in the movement area A of the self-moving robot MR, such that the three base stations BS are assuredly not on the same line, and thus a plane can be determined using the three base stations BS; after the base stations BS are placed, determining a plane coordinate system by the methods described above, wherein the plane coordinate system is located in the movement area A of the self-moving robot.

second, obtainment of sample points: obtaining sample points P by MR automatic gathering or artificial random gathering; and calculating coordinates of the respective sample points by Geometric Positioning method, Least Squares method or Time Difference Of Arrival method.

last, completion of boundary delimiting: delimiting a closed graphic according to the set of gathered sample points, wherein the delimiting method comprises straight line or curve interpolation or fitting; and dividing the movement area into an in-graphic area and an out-graphic area after the closed graphic is determined, hereby achieving the division of the movement area of the self-moving robot. In the embodiment shown in FIG. 3, a closed graphic M is determined using four gathered sample points P1 to P4. After the MR is set to be prohibited from crossing the closed graphic M, as shown by a plurality of straight lines N1 and N2 with arrows in FIG. 3 which shows the actual movement position of the MR, the MR only moves inside or outside the closed graphic M and does not cross the closed graphic M.

Further, the self-moving robot may be programmed and set to allow the self-moving robot to complete tasks for a certain time or a certain distance within the delimited boundary, and then leave the delimited boundary to continue other tasks.

Third Embodiment

Figure 4:
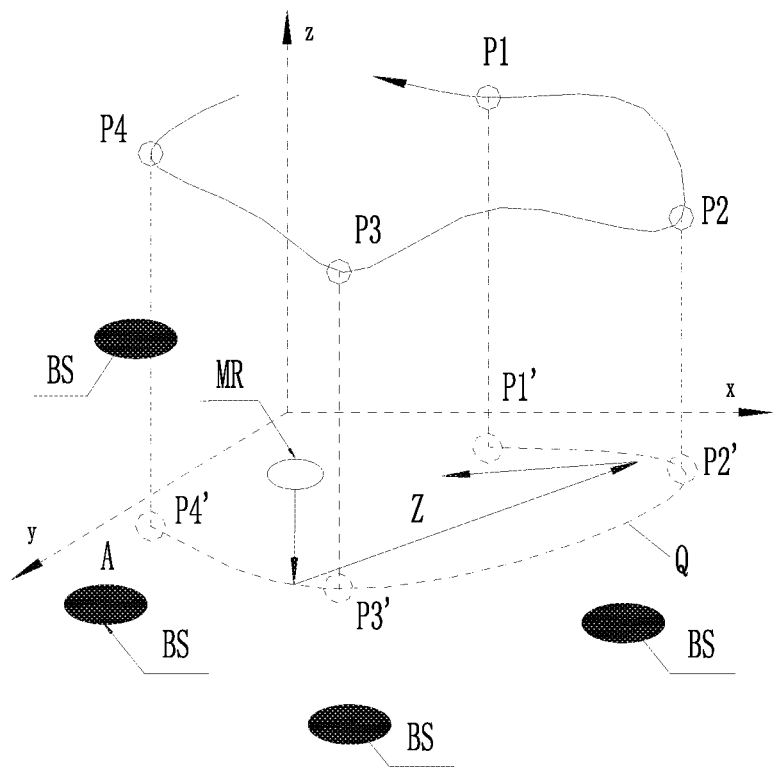
FIG. 4 is a schematic diagram of a third embodiment of the present invention.

FIG. 4 is a schematic diagram of the third embodiment of the present invention. As shown in FIG. 4, in the present embodiment, the self-moving robot movement boundary delimiting method mainly comprises the following steps:

first, determination of three-dimensional coordinate system: placing four base stations BS in the movement area A of the self-moving robot MR, such that the base stations BS form a three-dimensional space; determining a three-dimensional coordinate system after the base stations BS are placed, wherein when the MR is located in the three-dimensional coordinate system, the coordinates of the MR can be calculated according to a signal transmission time.

second, obtainment of sample points: obtaining sample points P by MR automatic gathering or artificial random gathering; and calculating the coordinates of the respective sample points by Geometric Positioning method, Least Squares method or Time Difference Of Arrival method.

last, completion of boundary delimiting, as shown in FIG. 4: vertically or non-vertically projecting the set of gathered sample points P onto the XY plane or other plane, wherein the projection plane is a plane in which the movement area A of the self-moving robot is located; and determining a boundary using the mapped points P1' to P4' after the sample points P1 to P4 gathered in the space are onto the plane coordinate system XOY, wherein the boundary may be consisted of multiple straight lines connected between the mapped points or may be an envelope curve. As shown in FIG. 3, in the present embodiment, the boundary is the curve Q. Then, the regional division is achieved by setting the MR to be prohibited from crossing the curve Q. As shown by a plurality of straight lines Z with arrows in FIG. 3 which shows the actual movement position of the MR, after the MR is set to be prohibited from crossing the curve Q, the MR only moves at one side of the curve Q and does not cross the curve Q to the other side. Similar to the first embodiment, if there are additional obstacles such as walls in the movement area A, the obstacles can be combined with the curve Q to achieve a completely separated regional division.

Therefore, in the present embodiment, the sample points are gathered when the self-moving robot moves in the space. Then, the gathered spatial sample points are projected onto the movement area A of the self-moving robot to form mapped points, and a straight line or a curve is determined using the mapped points. Then, the movement area is divided in the manner of prohibiting from crossing the boundary.

Fourth Embodiment

Figure 5:
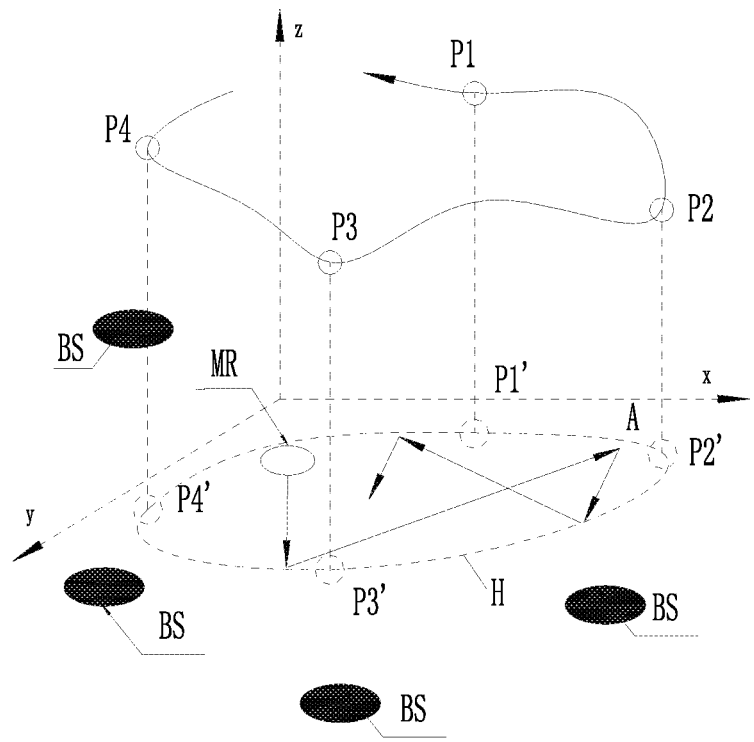
FIG. 5 is a schematic diagram of a fourth embodiment of the present invention.

FIG. 5 is a schematic diagram of the fourth embodiment of the present invention. As shown in FIG. 5 and in comparison with FIG. 4, in the present embodiment, the self-moving robot movement boundary delimiting method is substantially the same as that of the third embodiment in that: in both methods, the sample points are gathered when the self-moving robot moves in the space; hereafter, the gathered spatial sample points are projected onto the movement area A of the self-moving robot to form mapped points, and a straight line or a curve is determined with the mapped points; and then, the movement area is divided in the manner of prohibiting from passing across the boundary. The two methods only differ in the graphics formed using the mapped points. In the third embodiment, the graphic is formed as the non-closed curve Q, whereas in the present embodiment, the graphic is formed as a closed graphic H.

The other technical contents of the present embodiment are the same as those of the third embodiment and the detailed description thereof are omitted.

Fifth Embodiment

Figure 6:
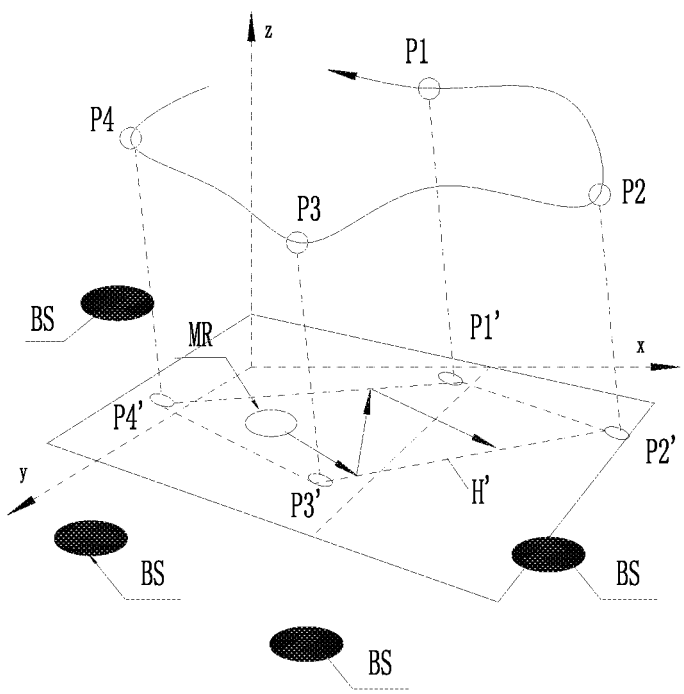
FIG. 6 is a schematic diagram of a fifth embodiment of the present invention.

FIG. 6 is a schematic diagram of the fourth embodiment of the present invention. As shown in FIG. 6 and in comparison of FIG. 5, in the present embodiment, the self-moving robot movement boundary delimiting method is substantially the same as that of the fourth embodiment in that: in both methods, the sample points are gathered when the self-moving robot moves in the space; hereafter, the gathered spatial sample points are projected onto the movement area A of the self-moving robot to form mapped points, and a straight line or a curve is determined with the mapped points; and then, the movement area is divided in the manner of prohibiting from passing across the boundary. The two methods only differ in the projecting directions. In the fourth embodiment, the projection is vertical, whereas in the present embodiment, the projection is non-vertical. In the case of the non-vertical projection, it is required to preset the projection angle and the projection direction in the processor program and then calculate the coordinates finally projected on the plane. A closed pattern H' is formed by the mapped points.

The other technical contents of the present embodiment are the same as those of the fourth embodiment and the detailed description thereof are omitted.

Sixth Embodiment

Figure 7:
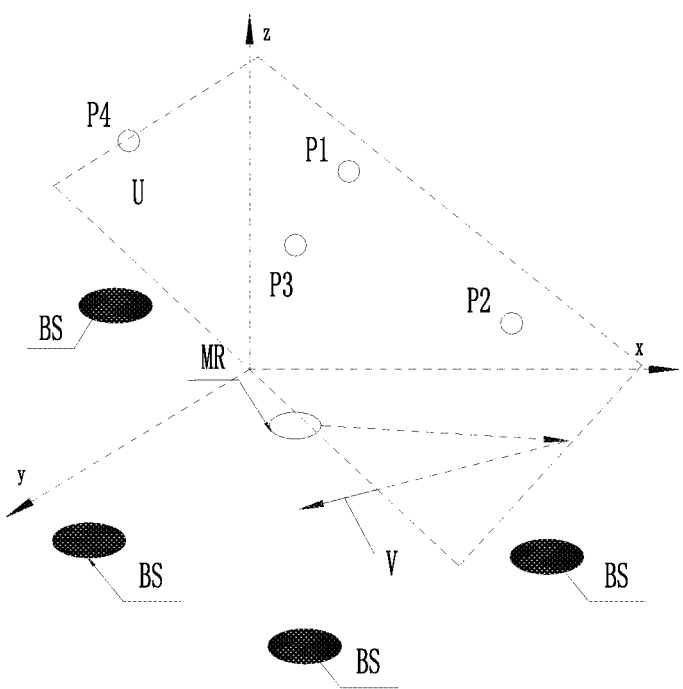
FIG. 7 is a schematic diagram of a sixth embodiment of the present invention.

FIG. 7 is a schematic diagram of the sixth embodiment of the present invention. As shown in FIG. 7, in the present embodiment, the self-moving robot movement boundary delimiting method mainly comprises the following steps:

first, determination of three-dimensional coordinate system: placing four base stations BS in the movement area A of the self-moving robot MR, such that the base stations BS form a three-dimensional space; determining a three-dimensional coordinate system is determined after the base stations BS are placed, wherein when the MR is located in the three-dimensional coordinate system, the coordinates of the MR can be calculated according to a signal transmission time.

second, obtainment of sample points: obtaining sample points P by MR automatic gathering or artificial random gathering; and calculating the coordinates of the respective sample points by Geometric Positioning method, Least Squares method or Time Difference Of Arrival method.

last, completion of boundary delimiting as shown in FIG. 7: under the assumption that there are four sample points P1-P4 in the three-dimensional space, determining a plane U using three sample points P1, P2 and P3, or fitting out a plane U using three or more sample points; and achieving a regional division in the manner of prohibiting the MR from crossing the plane. As shown in FIG. 7, after the boundary is delimited, the MR only can move below the plane U and cannot cross the plane U to move above the plane. It is to be noted that when this method is applied to a ground moving robot, the limitation to the robot by the plane U is the intersection line of the plane U and the ground.

The method of the present embodiment is applicable to both ground self-moving robots and flying self-moving robots.

Seventh Embodiment

Figure 8:
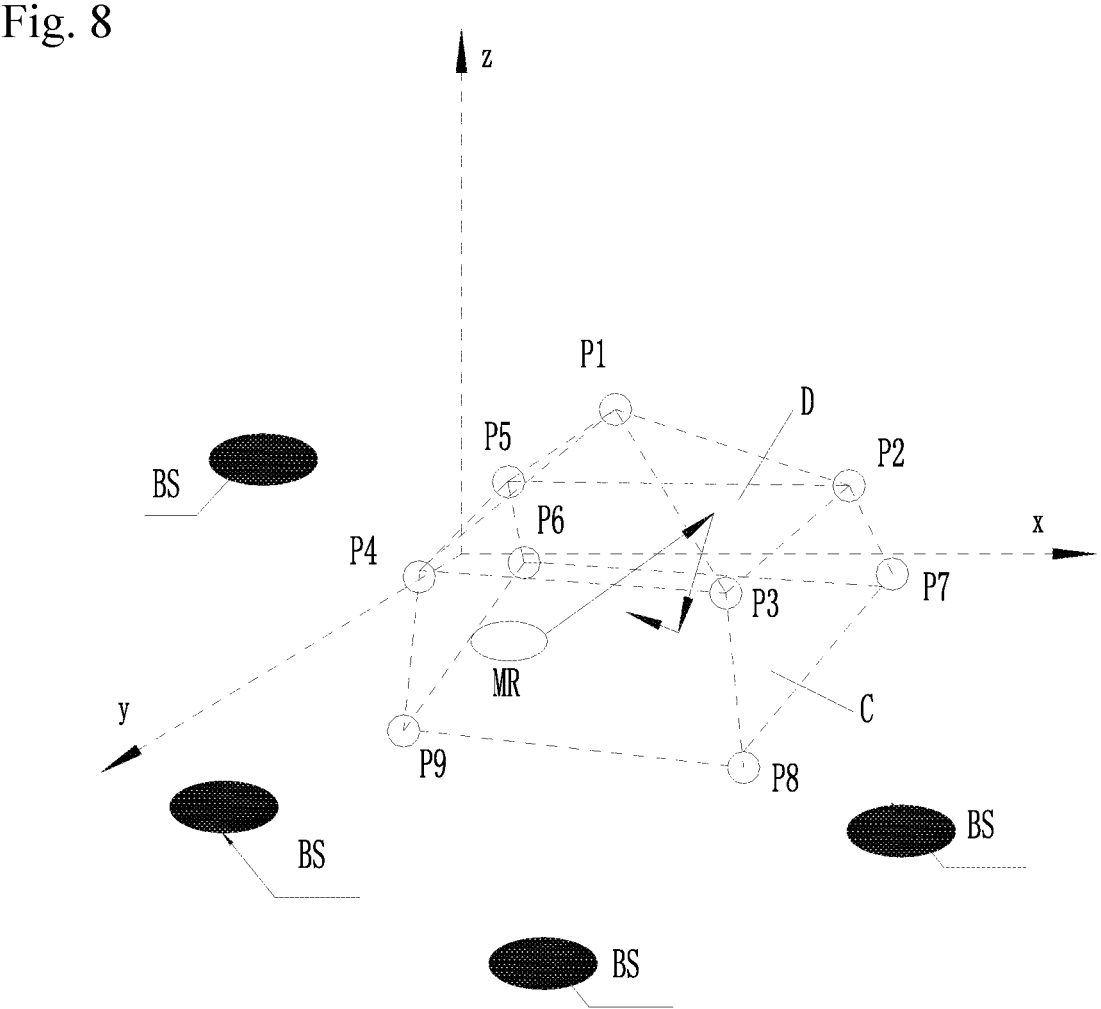
FIG. 8 is a schematic diagram of a seventh embodiment of the present invention.

FIG. 8 is a schematic diagram of the seventh embodiment of the present invention. As shown in FIG. 8, in the present embodiment, the self-moving robot movement boundary delimiting method mainly comprises the following steps:

first, determination of three-dimensional coordinate system: placing four base stations BS in the movement area A of the self-moving robot MR, such that the base stations BS form a three-dimensional space; determining a three-dimensional coordinate system after the base stations BS are placed, wherein when the MR is located in the three-dimensional coordinate system, the coordinates of the MR can be calculated according to a signal transmission time.

second, obtainment of sample points: obtaining sample points P by MR automatic gathering or artificial random gathering; and calculating the coordinates of the respective sample points by Geometric Positioning method, Least Squares method or Time Difference Of Arrival method.

last, completion of boundary delimiting as shown in FIG. 8: three-dimensionally constructing a three-dimensional space using a plurality of sample points P1 to P9 by interpolating or fitting the sample points into a combination of standard three-dimensional shapes (i.e., a combination of cuboid C and triangular pyramid D); and achieving a regional division by prohibiting the self-moving robot from moving outside the range defined by the three-dimensional space. As shown in FIG. 8, after the boundary is delimited, the MR only can move inside or outside the three-dimensional space and cannot cross the surface thereof. The three-dimensional space may be constructed as a single standard three-dimensional shape such as cube, cuboid, sphere or triangular pyramid or a combination of two or more of standard three-dimensional shapes by interpolating or fitting the sample points.

The method of the present embodiment is mainly applicable to flying self-moving robots.

As can be seen from the above seven embodiments, in the present invention, a plurality of base stations are placed in the movement area of the self-moving robot and the coordinates of the self-moving robot are determined by measuring the distances from the self-moving robot to the base stations, hereby delimiting a boundary. The areas divided by the boundary may be set as a working area or a non-working area. In the setting, the working area may also use the default area delimited by the self-moving robot, or may be selected artificially. In the first and second embodiments, the sampling is performed based on the plane movement trajectory, and the boundary is delimited on the plane. In the third, fourth and fifth embodiments, the sampling is performed based on the spatial movement trajectory, the vertical or non-vertical projection is conducted to form the mapped points on the plane, and then the boundary is delimited using the mapped points. In the sixth and seventh embodiments, the sampling is performed based on the spatial movement trajectory, and the boundary is delimited in the space.

In sum, the present invention provides a self-moving robot movement boundary delimiting method, which achieves regional division by distance measurement and positioning based on stationary base stations and have obvious advantages in term of either accuracy or convenience compared to the prior art.

What is claimed is:

1. A self-moving robot movement boundary delimiting method, comprising:
    setting up three or more base stations in a movement area of a self-moving robot, to establish a coordinate system according to relative locations between the three or more base stations;
    obtaining sample points along a desired boundary in the movement area by moving a positioning device coupling with the self-moving robot along the desired boundary, and determining coordinates of the sample points in the coordinate system; and
    delimiting a movement boundary according to the coordinates of the obtained sample points, and setting the self-moving robot to work inside or outside the movement boundary.

2. The self-moving robot movement boundary delimiting method of claim 1, wherein,
    the coordinate system is established by using one of the base stations as an origin, and calculating distances between the respective base stations by measuring signal transmission time between the respective base stations, whereby determining the coordinates of the respective base stations in the coordinate system.

3. The self-moving robot movement boundary delimiting method of claim 2, wherein,
    the coordinate system is a plane coordinate system established using three base stations, and a plane in which the plane coordinate system is located is coplanar with the movement area of the self-moving robot.

4. The self-moving robot movement boundary delimiting method of claim 1, wherein,
    the determining the coordinates of the sample points in the coordinate system specifically comprises: calculating the coordinates of the sample points in the coordinate system by measuring signal transmission time between the self-moving robot and the respective base stations,
    according to Geometric Positioning method, Least Squares method or Time Difference Of Arrival method.

5. The self-moving robot movement boundary delimiting method of claim 4, wherein,
    the coordinate system is a plane coordinate system established using three base stations, and a plane in which the plane coordinate system is located is coplanar with the movement area of the self-moving robot.

6. The self-moving robot movement boundary delimiting method of claim 1, wherein,
    the positioning device is provided on the self-moving robot, and the moving the positioning device coupling with the self-moving robot along the desired boundary specifically comprises:
    controlling the self-moving robot to move by a user via an interactive device; or
    moving the positioning device along the desired boundary after the positioning device is detached from the self-moving robot by a user; or
    moving the self-moving robot along the desired boundary while the self-moving robot is held by a user.

7. The self-moving robot movement boundary delimiting method of claim 6, wherein, the coordinate system is a plane coordinate system established using three base stations, and a plane in which the plane coordinate system is located is coplanar with the movement area of the self-moving robot.

8. The self-moving robot movement boundary delimiting method of claim 1, wherein,
    the sample points are obtained at a preset time interval performed automatically by the self-moving robot or obtained at a random interval controlled by a user.

9. The self-moving robot movement boundary delimiting method of claim 8, wherein,
    the coordinate system is a plane coordinate system established using three base stations, and a plane in which the plane coordinate system is located is coplanar with the movement area of the self-moving robot.

10. The self-moving robot movement boundary delimiting method of claim 1, wherein,
    the coordinate system is a plane coordinate system established using three base stations, and a plane in which the plane coordinate system is located is coplanar with the movement area of the self-moving robot.

11. The self-moving robot movement boundary delimiting method of claim 10, wherein,
    the movement boundary is an open or closed line formed by the sample points.

* * * * *